(12) United States Patent
Ikebukuro et al.

(10) Patent No.: US 8,777,146 B2
(45) Date of Patent: Jul. 15, 2014

(54) DUAL-BEARING REEL

(71) Applicant: Shimano Inc., Osaka (JP)

(72) Inventors: Satoshi Ikebukuro, Osaka (JP); Takanori Maruoka, Osaka (JP)

(73) Assignee: Shimano Inc., Osaka (JP)

( * ) Notice: Subject to any disclaimer, the term of this patent is extended or adjusted under 35 U.S.C. 154(b) by 57 days.

(21) Appl. No.: 13/692,266

(22) Filed: Dec. 3, 2012

(65) Prior Publication Data

US 2013/0193250 A1    Aug. 1, 2013

(30) Foreign Application Priority Data

Jan. 27, 2012  (JP) ................................. 2012-014741
Apr. 24, 2012  (JP) ................................. 2012-098495

(51) Int. Cl.
*A01K 89/01*       (2006.01)
(52) U.S. Cl.
USPC ......................................... 242/261; 242/262
(58) Field of Classification Search
CPC .................................................... A01K 89/015
USPC ........................................ 242/257, 261, 262
See application file for complete search history.

(56) References Cited

U.S. PATENT DOCUMENTS

| | | | | |
|---|---|---|---|---|
| 4,168,812 A | * | 9/1979 | Karlsson | 242/261 |
| 4,824,046 A | * | 4/1989 | Emura et al. | 242/261 |
| 5,222,995 A | * | 6/1993 | Sato | 242/258 |
| 5,350,133 A | * | 9/1994 | Morimoto | 242/261 |
| 5,388,778 A | * | 2/1995 | Morimoto | 242/261 |
| 5,489,070 A | * | 2/1996 | Puryear et al. | 242/261 |
| 5,791,576 A | * | 8/1998 | Miyazaki | 242/261 |
| 5,921,490 A | * | 7/1999 | Sato | 242/261 |
| 7,398,939 B2 | * | 7/2008 | Terauchi et al. | 242/250 |
| 7,798,439 B2 | * | 9/2010 | Tsutsumi | 242/257 |
| 2002/0033426 A1 | * | 3/2002 | Kitajima et al. | 242/261 |
| 2007/0114314 A1 | * | 5/2007 | Bin Ahmad | 242/245 |
| 2009/0250541 A1 | * | 10/2009 | Tsutsumi | 242/257 |

FOREIGN PATENT DOCUMENTS

JP          2002-084936 A       3/2002

* cited by examiner

*Primary Examiner* — Emmanuel M Marcelo
(74) *Attorney, Agent, or Firm* — Global IP Counselors

(57) ABSTRACT

A dual-bearing reel includes a reel unit, a spool, a handle, a clutch mechanism, a clutch operation member, a clutch return mechanism, and a clutch control mechanism. The clutch control mechanism includes a clutch plate that moves in conjunction with movement of the clutch operation member from the on position to the off position and causes the clutch operation member to move from the off position to the on position in conjunction with the operation of the clutch return mechanism. The clutch operation member includes a contact portion at which the clutch operation member contacts at least first end surfaces of the clutch plate. The contact portion includes a first contact portion that is urged to the side of the reel unit by the clutch plate when the clutch operation member is moved from the off position to the on position by the clutch plate.

9 Claims, 9 Drawing Sheets

DUAL-BEARING REEL

CROSS-REFERENCE TO RELATED APPLICATIONS

This application claims priority to Japanese Patent Application Nos. 2012-014741 and 2012-098495 filed on Jan. 27, 2012 and Apr. 24, 2012 respectively. The entire disclosure of Japanese Patent Application Nos. 2012-014741 and 2012-098495 is hereby incorporated herein by reference.

BACKGROUND

1. Technical Field

The present invention relates to fishing reel and particularly to a dual-bearing reel that forwardly reels out a fishing line.

2. Related Art

Among dual-bearing reels, a dual-bearing reel having a clutch operation member that can move up and down in a rear portion between side plates of a reel unit has conventionally been known (e.g., see JP-A No. 2002-084936). The clutch operation member in the conventional dual-bearing reel has an operation portion main body and a guide shaft that is disposed in the operation portion main body. The guide shaft is placed along a right-and-left direction and is guided by a guide member that has a slit disposed on a handle attachment side of the reel unit. The clutch operation member can move between an ON position in which the clutch operation member switches a clutch mechanism to an ON state and an OFF position that is below the ON position. When the clutch operation member is operated to the OFF position, the clutch mechanism switches to an OFF state. A clutch plate for controlling the ON and OFF of the clutch mechanism is engaged with the clutch operation member. When the clutch operation member is moved downward toward the OFF position, the clutch plate rotates and the clutch mechanism switches to the OFF state. The clutch mechanism returns to the clutch ON state when a handle is rotated in a fishing-line winding direction. At this time, the clutch plate rotates in the opposite direction and returns the clutch operation member to the ON position.

SUMMARY

It is conceivable for both ends of the clutch operation member to be placed in such a way that they are allowed to slidingly contact the reel, so that the clutch operation member is supported at both ends. However, when the clutch operation member is supported at both ends, sometimes the clutch operation member leans when returning the clutch operation member from the OFF position to the ON position by rotating the handle in the fishing-line winding direction. This is because the clutch plate causes the clutch operation member to move from one side. When the clutch operation member leans, the contact between the reel unit and the clutch operation member becomes unstable, it becomes difficult for the clutch operation member to move, and it becomes difficult for the clutch operation member to return to the ON position.

It is a problem to make it easier, in a dual-bearing reel in which a clutch operation member returns from an OFF position to an ON position because of a clutch plate, for the clutch operation member to return to the ON position even when the clutch operation member is supported at both ends.

A dual-bearing reel that forwardly reels out a fishing line includes a reel unit, a spool, a handle, a clutch mechanism, a clutch operation member, a clutch return mechanism, and a clutch control mechanism. The reel unit includes a rod attachment portion that is attachable to a fishing rod. The spool is supported by the reel unit to be rotated. The handle is configured on a side of the reel unit to operate rotationally the spool. The clutch mechanism is configured between the handle and the spool. The clutch operation member includes two ends being supported by the reel unit, where the clutch operation member is arranged to be operated in order to make the clutch mechanism at least turning off in linking the handle and the spool. The clutch return mechanism is configured to turn the clutch mechanism on in response to rotation of the handle in a fishing-line winding direction. The clutch control mechanism is configured between the clutch operation member and the clutch mechanism to transmit an operation of the clutch operation member to the clutch mechanism, turn the clutch mechanism to on in response to an operation of the clutch return mechanism, and return the clutch operation member from an off position to an on position. The clutch control mechanism includes a clutch plate that moves in conjunction with movement of the clutch operation member from the on position to the off position and causes the clutch operation member to move from the off position to the on position in conjunction with the operation of the clutch return mechanism. The clutch plate including a first end surface closer to the on position than to the off position of the clutch operation member and a second end surface opposite to the first end surface. The clutch operation member includes a contact portion at which the clutch operation member contacts at least the first end surface of the clutch plate. The contact portion includes a first contact portion that is urged to the side of the reel unit by the clutch plate when the clutch operation member is moved from the off position to the on position by the clutch plate.

BRIEF DESCRIPTION OF THE DRAWINGS

FIG. 9 is a schematic view showing a state of contact between a guide member and a clutch plate when switching from clutch OFF to clutch ON.

DETAILED DESCRIPTION OF THE PREFERRED EMBODIMENTS

Common Configuration of Reel

Figure 1:
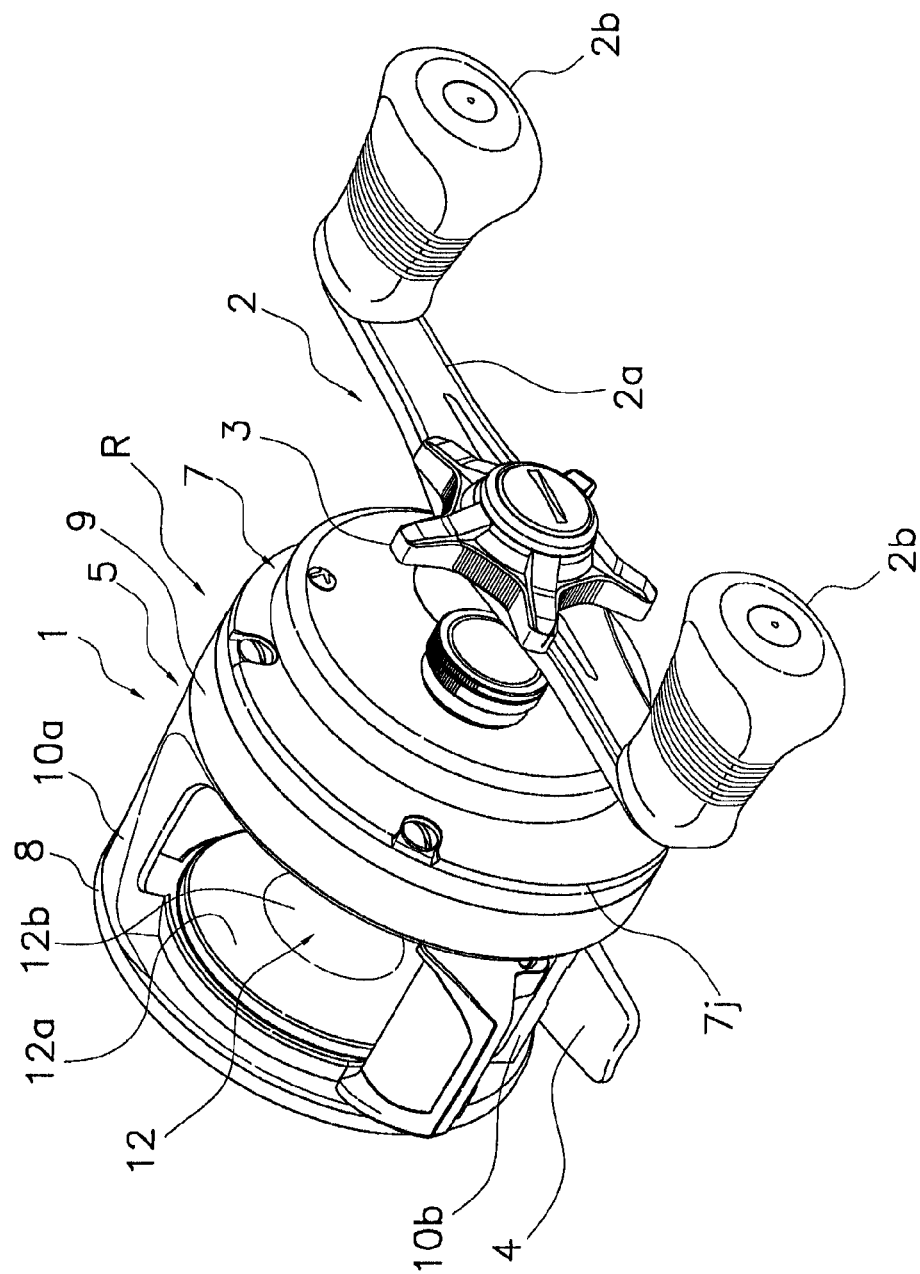
FIG. 1 is a perspective view of a dual-bearing reel according to an embodiment of the present invention.
Figure 2:
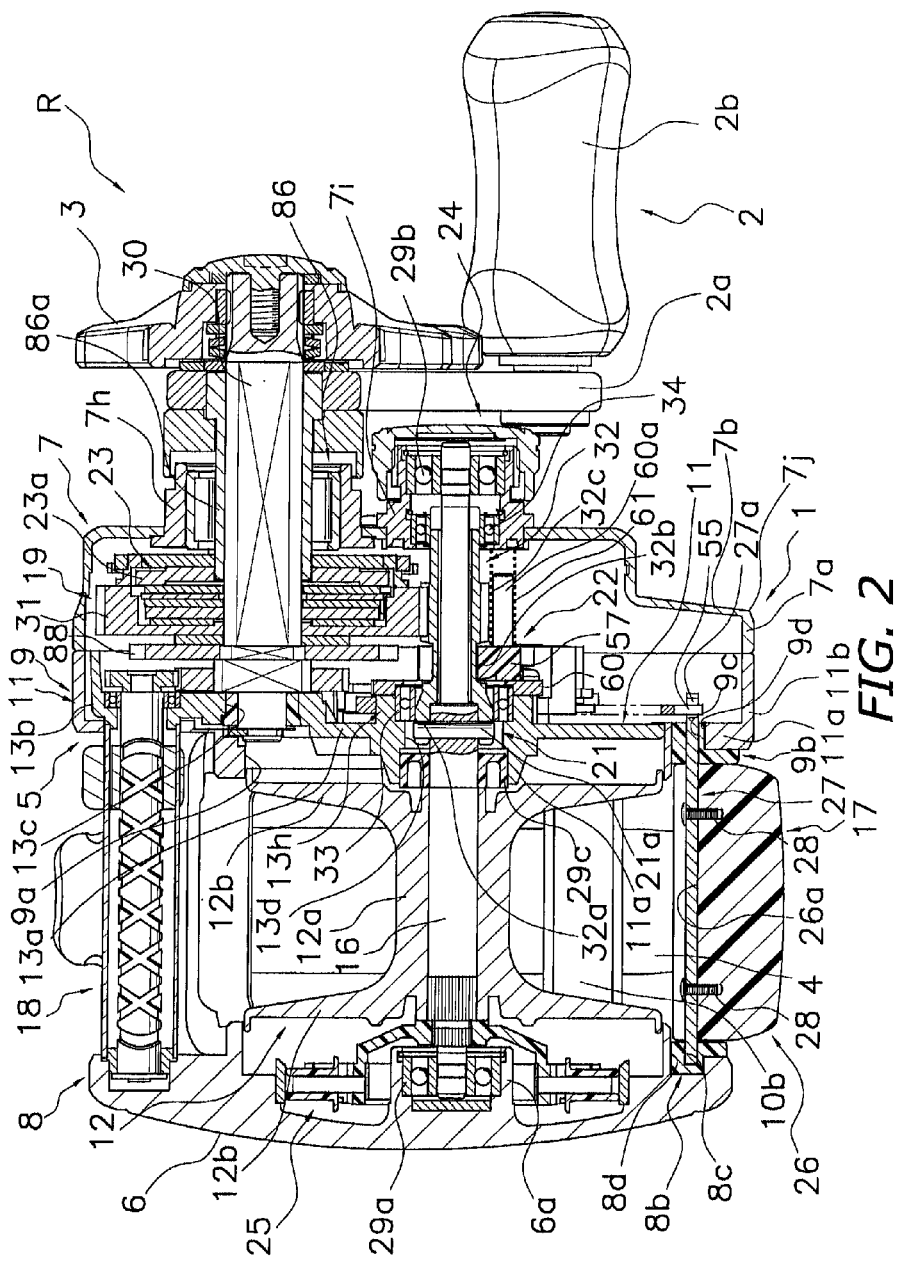
FIG. 2 is a transverse sectional view of the dual-bearing reel.

In FIG. 1 and FIG. 2, a dual-bearing reel R according to an embodiment of the present invention is a round baitcast reel. The dual-bearing reel R is equipped with a reel unit 1, a handle 2 for spool rotation that is placed on one side of the reel unit 1 (in the present embodiment, on the right side of the reel unit 1), a star drag 3 serving as a drag adjustment member that is placed on the side of the handle 2 away from the reel unit 1, and a spool 12 that is supported, in such a way that it can freely rotate, in the reel unit 1.

The star drag 3 is placed on an axial direction outermost side, and the handle 2 is placed on the axial direction inside of the star drag 3. The handle 2 has a handle arm 2a and handle knobs 2b that are attached, in such a way that they can freely rotate, to both ends of the handle arm 2a. The handle arm 2a rotates integrally with a drive shaft 30 (see FIG. 2). The drive shaft 30 penetrates the handle arm 2a and screws together with the star drag 3. The drive shaft 30 is supported, in such a way that it can freely rotate, in the reel unit 1 and rotates when the handle 2 is rotationally operated. The handle arm 2a is coupled to, in such a way as to be integrally rotatable with and immovable in the axial direction, an inner ring 86a (see FIG. 2) of a later-described roller one-way clutch 86. The inner ring 86a is coupled to, in such a way as to be integrally rotatable with, a drag plate 23a of a drag mechanism 23 that brakes the rotation of the spool 12 in a fishing-line releasing direction. The drag plate 23a is coupled to, in such a way as to be integrally rotatable with, the drive shaft 30. Consequently, the rotation of the handle 2 is transmitted via the inner ring 86a and the drag mechanism 23 to the drive shaft 30.

Configuration of Reel Unit

As shown in FIG. 3 to FIG. 6, the reel unit 1 is generally a member made of metal such as an aluminum alloy or a magnesium alloy. The reel unit 1 is equipped with a frame 5, a first side cover 6, and a second side cover 7 that are placed on both sides of the frame 5. The spool 12 for spooling is detachably attached, in such a way that it can freely rotate via a spool shaft 16, inside the reel unit 1. Further, the reel unit 1 is further equipped with a reinforcement member 14 that reinforces the second side cover 7, first bolt members 50 that position the reinforcement member 14, and regulation portions 54 that regulate the reinforcement member 14. The first bolt members 50 are an example of bolt members.

The frame 5 has a first side plate 8 and a second side plate 9, which are placed in such a way as to oppose each other a predetermined interval apart from each other, and an upper and lower first connection portion 10a and second connection portion 10b, which integrally interconnect the first side plate 8 and the second side plate 9. The first side cover 6 is integrally formed in the first side plate 8. The first side plate 8 is a disc-shaped member made of metal such as an aluminum alloy or a magnesium alloy, for example. The first side plate 8 has, in its rear portion, a first insert member 8b made of synthetic resin that is long in an up-and-down direction (a direction orthogonal to the page of FIG. 2). The first insert member 8b has a first slit 8c that is formed along the up-and-down direction. The first insert member 8b is fitted into and attached to an oval-shaped first opening 8d that is formed along the up-and-down direction in the first side plate 8. The first side cover 6 is integrally formed in the axial direction outside surface of the first side plate 8. The outer peripheral surfaces of the first side plate 8, the second side plate 9, and the first connection portion 10a are cut. The second side cover 7 is an example of a cover member.

A tubular bearing receiving portion 6a that projects inward in the axial direction is formed on the axial direction inside surface of the first side cover 6. The first connection portion 10a is disposed on the upper portion of the dual-bearing reel R, and the second connection portion 10b is disposed on the lower portion of the dual-bearing reel R. A rod attachment portion 4 for attaching the dual-bearing reel R to a fishing rod is integrally or separately disposed on the second connection portion 10b.

The second side plate 9 has a side plate main body 11 made of metal such as an aluminum alloy or a magnesium alloy, for example, and a mechanism attachment plate 13 made of synthetic resin such as polyacetal or polyimide resin. The side plate main body 11 has a circular shape as seen from the spool 12 axial direction and is a flat, bottomed tubular member having a space inside. The side plate main body 11 has a circular bottom plate portion 11a and a tubular portion 11b that is placed around the bottom plate portion 11a. A circular opening 11c through which the spool 12 can pass is formed slightly above the center portion of the bottom plate portion 11a. Plural (e.g., three) threaded portions 11d, into which the plural (e.g., three) first bolt members 50 for fixing the second plate cover 7 to the side plate main body 11 screw, are formed apart from each other with an interval in the circumferential direction in the inner peripheral surface of the tubular portion 11b. The three threaded portions 11 have female threads 11e and are formed projecting inward in a radial direction on the inner peripheral surface of the tubular portion 11b.

The side plate main body 11 of the second side plate 9 has a second insert member 9b made of synthetic resin that is long in the up-and-down direction and is placed in a position opposing the first insert member 8b. The second insert member 9b has a second slit 9c that is formed along the up-and-down direction. The second insert member 9b is fitted into and attached to an oval-shaped second opening 9d that is formed along the up-and-down direction in the second side plate 9. The rod attachment portion 4, which can attach the reel R to a fishing rod, is integrally or separately formed on the lower second connection portion 10b.

Figure 4:
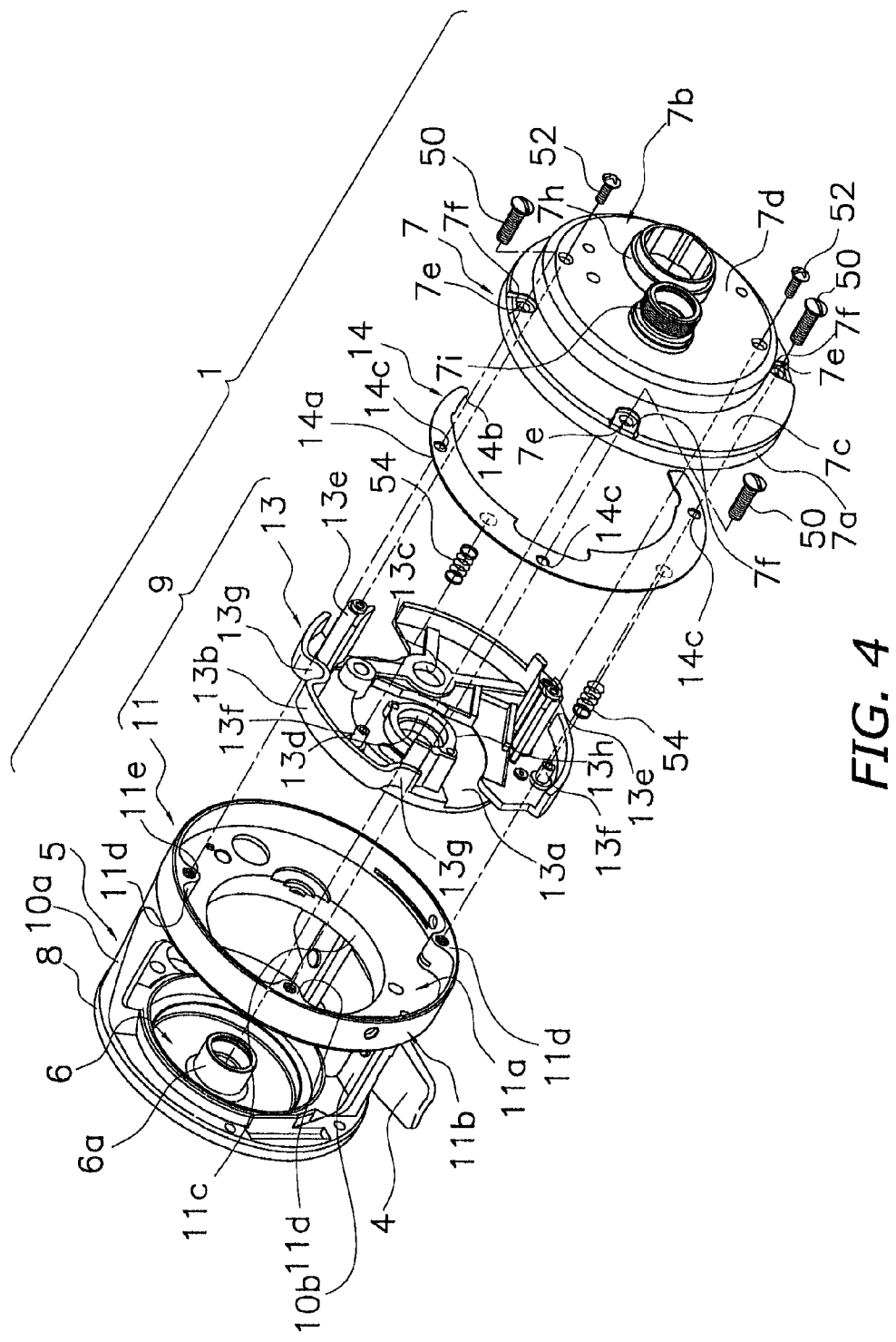
FIG. 4 is an exploded perspective view of the reel unit.
Figure 5:
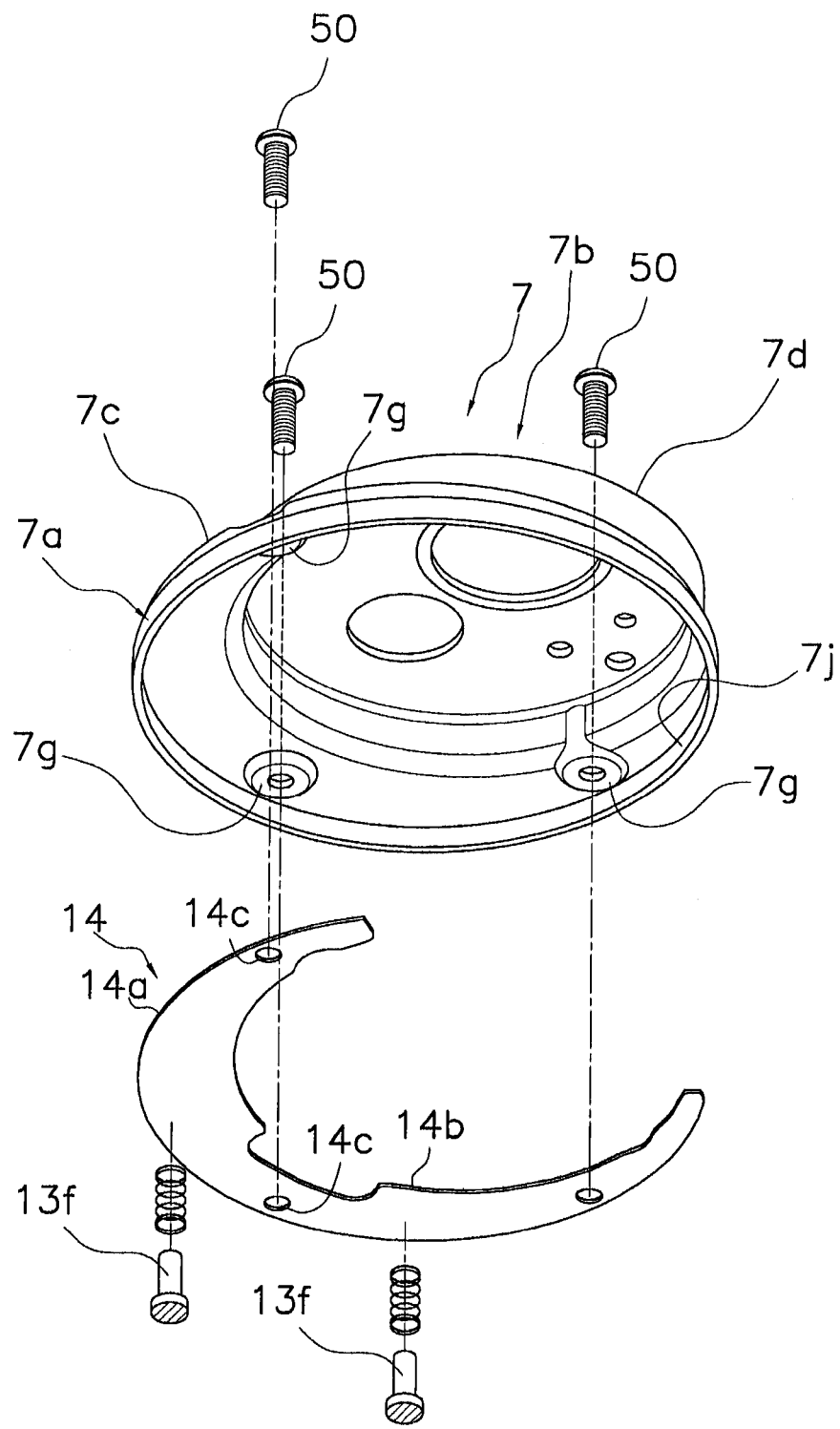
FIG. 5 is an exploded perspective view of a first side cover and a reinforcement member.
Figure 6:
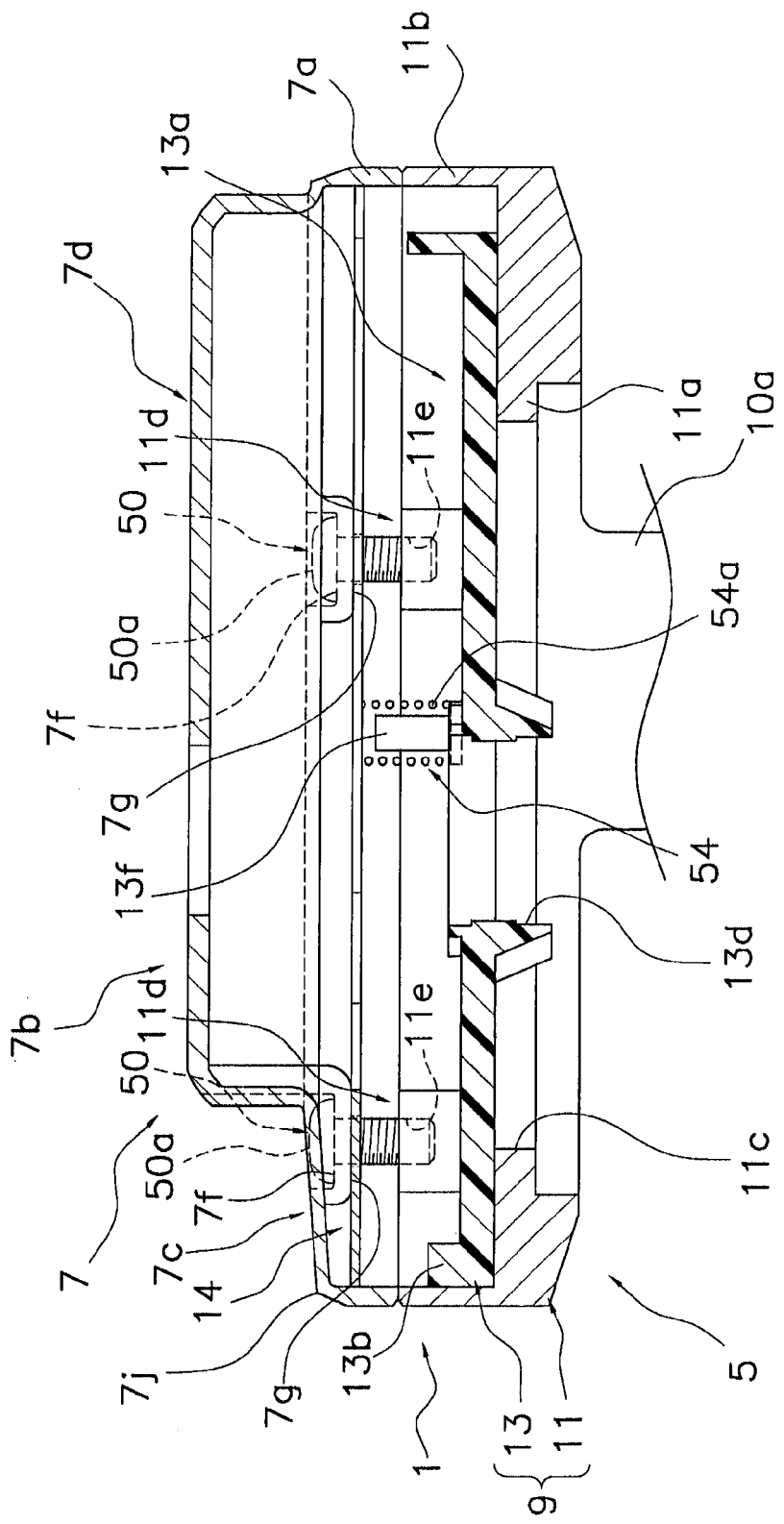
FIG. 6 is a sectional view of the reel unit resulting from cutting plane line VI-VI of FIG. 3.

As shown in FIG. 4 to FIG. 6, the mechanism attachment plate 13 is detachably fixed to the first side cover 6 by second bolt members 52. The mechanism attachment plate 13 is disposed in order to attach various mechanisms. The mechanism attachment plate 13 is disposed in such a way that various mechanisms attached inside can be attached and detached integrally with the second side cover 7. The mechanism attachment plate 13 has a plate portion 13a, which is placed in contact with the bottom plate portion 11a of the second side plate 9, and a wall portion 13b, which is placed around the plate portion 13a. A third opening 13c for supporting the drive shaft 30 and a fourth opening 13d for supporting the spool shaft 16 and a later-described pinion gear 32 are formed in the plate portion 13a. The third opening 13c and the fourth opening 13d are stepped circular openings. Further, the plate portion 13a has plural (e.g., two) attachment bosses 13e, which come into contact with the inside surface of the second side cover 7, and plural (e.g., two) cylindrical holding portions 13f, which extend toward the second side cover 7. The second bolt members 52 screw into the first attachment bosses 13e. Later-described coil springs 54a are held on the plural holding portions 13f. The wall portion 13b is divided into a plural number (e.g., two). Three recess portions 13g through which the three first bolt members 50 can pass are formed in the wall portions 13b. The recess portions 13g are formed recessed in correspondence to the threaded portions 11d of the side plate main body 11. A fifth boss portion 13h is formed around the fourth opening 13d.

Figure 3:
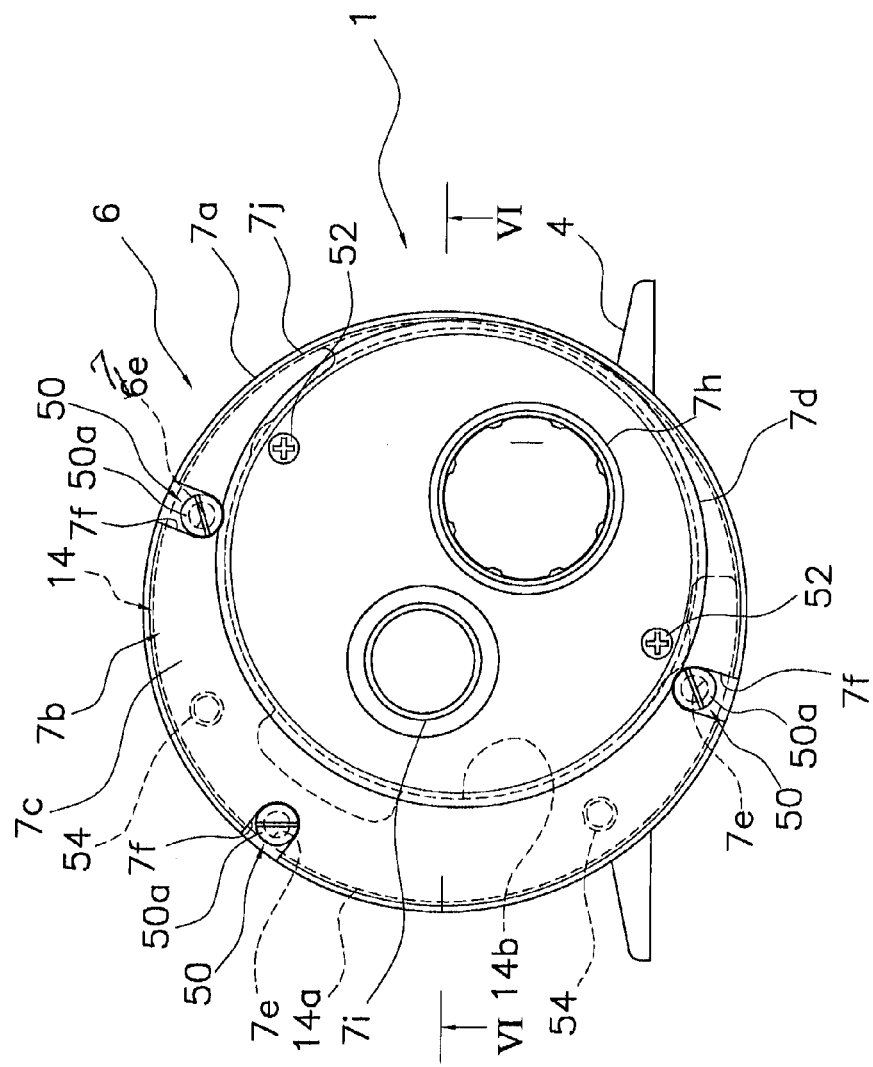
FIG. 3 is a side view of a reel unit.

As shown in FIG. 3, FIG. 5, and FIG. 6, the second side cover 7 is a member made of metal such as an aluminum alloy or a magnesium alloy that has been press-formed. The second side cover 7 is fixed to the second side plate 9 of the frame 5 by the three first bolt members 50 in such a way that the second side cover 7 can be freely attached to and detached from the second side plate 9. When the second side cover 7 is attached and detached, the mechanism attachment plate 13 fixed to the second side cover 7 by the second bolt members 52 can also be attached and detached at the same time. Because of this, the spool 12 can be removed from the opening 11c disposed on the handle attachment side. The second side cover 7 has a cylinder-shaped edge portion 7a, which can be coupled to the outer peripheral portion of the second side plate 9, and a cover portion 7b, which is formed integrally with the edge portion 7a and covers the axial direction outside of the second side plate 9 in such a way that the cover portion 7b can form a space for storing mechanisms between itself and the second side plate 9. The outer peripheral surface of the edge portion 7a and the cover portion 7b are cut. Because of this, a shape in which there is a corner portion 7j between the edge portion 7a and the cover portion 7b can be realized. The end surface of the edge portion 7a is placed in abutment with the end surface of the tubular portion 11b of the side plate main body 11 of the second side plate 9.

The cover portion 7b has a circular first cover portion 7c, which is formed integrally with the edge portion 7a, and a bottomed cylinder-shaped second cover portion 7d, which bulges at least in the axial direction of the drive shaft 30 from the first cover portion 7c. The first cover portion 7c is placed concentrically with the circular side plate main body 11. The second cover portion 7d is, in this embodiment, formed bulging circularly about a position on the front lower side of the first cover portion 7c. Further, the second cover portion 7d is placed within the first cover portion 7c. Consequently, the second cover portion 7d does not project outward in the radial direction beyond the first cover portion 7c. Three bolt through-holes 7e that the first bolt members 50 penetrate are formed on the outer peripheral side of the first cover portion 7c. Around the bolt through-holes 7e, there are formed three seat surfaces 7f that are recessed at the time of press formation in order to place head portions 50a of the first bolt members 50 in such a way that the head portions 50a do not project from the outside surface of the first cover portion 7c. Consequently, three projecting portions 7g are formed in the sections of the inside surface of the first cover portion 7c where the seat surfaces 7f are formed.

A third boss portion 7h for supporting the drive shaft 30 and a fourth boss portion 7i for supporting the spool shaft 16 are attached to the second cover portion 7d. The third boss portion 7h and the fourth boss portion 7i are cut tubular members and are fixed by appropriate fixing means such as caulked fixing in circular open portions formed in the second cover portion 7d. In FIG. 5 and FIG. 6, illustration of the third boss portion 7h and the fourth boss portion 7i is omitted.

As shown in FIG. 3 to FIG. 6, the reinforcement member 14 is a crescent-shaped plate member made of metal such as an aluminum alloy, for example. The reinforcement member 14 is disposed in contact with at least part of the inner peripheral surface of the edge portion 7a of the second side cover 7 in order to reinforce the edge portion 7a. In this embodiment, the reinforcement member 14 is disposed in contact with part of the edge portion 7a. The reason the reinforcement member 14 has a crescent shape is because the reinforcement member 14 is formed to match the section of the first cover portion 7c whose area is larger than that of the second cover portion 7d because, in this embodiment, the second cover portion 7d is disposed off-center from the first cover portion 7c. Because of this, the space in the section covered by the second cover portion 7d can be efficiently used for storing various mechanisms.

An outer peripheral surface 14a of the reinforcement member 14 is formed along the inner peripheral surface of the edge portion 7a. An inner peripheral surface 14b of the reinforcement member 14 is formed generally along the step between the first cover portion 7c and the second cover portion 7d. The reinforcement member 14 has plural (e.g., three) through-holes 14c that the first bolt members 50 for fixing the second side cover 7 can penetrate. The reinforcement member 14 is positioned in a direction intersecting the axial direction of the first bolt members 50 as a result of the first bolt members 50 penetrating the through-holes 14c. Further, the movement of the reinforcement member 14 in the axial direction is regulated by the regulation portions 54. The regulation portions 54 have coil springs 54a serving as urging members, for example.

The coil springs 54a are held on the outer peripheral surfaces of the holding portions 13f disposed on the mechanism attachment plate 13. The coil springs 54a are placed in a compressed state between the reinforcement member 14 and the holding portions 13f. The coil springs 54a uege the reinforcement member 14 toward the first side cover 6. The reinforcement member 14 urged toward the first side cover 6 by the coil springs 54a contacts the projecting portions 7g formed projecting on the inside surface (back surface) on the outer peripheral side of the first cover portion 7c of the second side cover 7. Because of this, the movement of the reinforcement member 14 in the axial direction of the first bolt members 50 is regulated, and the reinforcement member 14 can reliably reinforce the edge portion 7a.

The spool 12, a clutch operation member 17 that becomes a thumb rest when thumbing the spool 12, and a level-wind mechanism 18 for winding the fishing line uniformly inside the spool 12 are placed between the first side plate 8 and the second side plate 9 of the frame 5. Further, a rotation transmission mechanism 19 for transmitting rotational force from the handle 2 to the spool 12 and the level-wind mechanism 18, a clutch mechanism 21, a clutch control mechanism 22 for controlling the clutch mechanism 21 in response to the operation of the clutch operation member 17, the drag mechanism 23 that brakes the spool 12, and a casting control mechanism 24 for adjusting the force of resistance at the time of rotation of the spool 12 are placed between the frame 5 and the second side cover 7. The level-wind mechanism 18 is disposed for evenly winding the fishing line in a right-and-left direction of the spool 12. The casting control mechanism 24 always brakes the rotation of the spool 12. A centrifugal brake mechanism 25 for preventing fishing line backlash when casting is placed between the first side plate 8 and the spool 12. The centrifugal brake mechanism 25 utilizes centrifugal force produced by the rotation of the spool 12 to brake the spool 12.

Mechanisms such as the clutch control mechanism 22 and the rotation transmission mechanism 19 are attached to the mechanism attachment plate 13. The mechanism attachment plate 13 is disposed in such a way that the mechanisms attached inside can be attached and detached integrally with the second side cover 7. The mechanism attachment plate 13 is fixed to the second side cover 7 by screws in such a way that the mechanism attachment plate 13 can be freely attached to and detached from the second side cover 7. The mechanism attachment plate 13 is placed in contact with the outside surface of the s side plate main body 11.

Configurations of Spool and Spool Shaft

The spool 12 is supported, in such a way that it can freely rotate, in the reel unit 1. As shown in FIG. 2, the spool 12 has dish-shaped flange portions 12a on both side portions and has a tubular spool barrel portion 12b between both of the flange portions 12a. The spool 12 is fixed, in such a way as to be non-rotatable, by serrated coupling, for example, to the spool shaft 16 that penetrates the spool barrel portion 12b. This fixing method is not limited to serrated coupling, and various coupling methods such as keyed coupling and splined coupling can be used.

The spool shaft 16 penetrates the second side plate 9 and extends to the outside of the second side cover 7. One end of the spool shaft 16 is supported, in such a way that it can freely rotate, in the first side plate 8 by a first bearing 29a in the form of a ball bearing. The other end of the spool shaft 16 is supported, in such a way that it can freely rotate, in the second side cover 7 by a second bearing 29b in the form of a ball bearing. Further, the middle portion of the spool shaft 16 is supported, in such a way that it can freely rotate, in the mechanism attachment plate 13 by a third bearing 29c in the form of a slide bearing. The one end of the spool shaft 16 penetrates the second side plate 9 and projects outward from the fourth boss portion 7i of the second side cover 7.

The first bearing 29a on the left side of FIG. 2 is attached to the bearing receiving portion 6a formed in the first side cover 6. The second bearing 29b on the right side of FIG. 2 is attached to the fourth boss portion 7i of the second side cover 7. The third bearing 29c in the middle is attached to the fourth opening 13d formed in the mechanism attachment plate 13.

To the right of the spool 12 attachment section of the spool shaft 16 in FIG. 2, an engagement pin 21a that configures the clutch mechanism 21 is fixed. The engagement pin 21a penetrates the spool shaft 16 along its diameter, and both ends of the engagement pin 21a project in the radial direction.

Configuration of Clutch Operation Member

As shown in FIG. 2, the clutch operation member 17 is placed on the rear side of the spool 12 between the first side plate 8 and the second side plate 9. The clutch operation member 17 can move between an ON position shown in FIG. 7 that is away from the rod attachment portion 4 and an OFF position shown in FIG. 8 that is closer to the rod attachment portion 4 than the ON position. Both ends of the clutch operation member 17 in the right-and-left direction are supported in the rear portion of the frame 5. The clutch operation member 17 is for switchingly operating the clutch mechanism 21 at least from an ON state to an OFF state.

The clutch operation member 17 is attached between the first side plate 8 and the second side plate 9 in such a way that the clutch operation member 17 can freely slide in the up-and-down direction and in such a way that the clutch operation member 17 cannot fall out. The clutch operation member 17 has an operation portion main body 26 made of synthetic resin that is placed between the first side plate 8 and the second side plate 9 and a guide member 27 made of metal plate material that is fixed to the operation portion main body 26. Both ends of the operation portion main body 26 are placed opposing the inside surfaces of the first insert member 8b of the first side plate 8 and the second insert member 9b of the second side plate 9 across slight interstices. A fixing recess portion 26a that is long in the right-and-left direction and is for fixing the guide member 27 is formed in the front surface of the operation portion main body 26.

The guide member 27 is fixed by at least one screw 28, for example, to the operation portion main body 26. Both ends of the guide member 27 in the right-and-left direction are guided in the first slit 8c and the second slit 9c. Further, the end portion of the guide member 27 on the right side in FIG. 2 (an example of an end portion on one side) extends beyond the second slit 9c. The guide member 27 has, on the end portion on the right side, a contact portion 27a that contacts a later-described clutch plate 55 of the clutch control mechanism 22.

Figure 9:
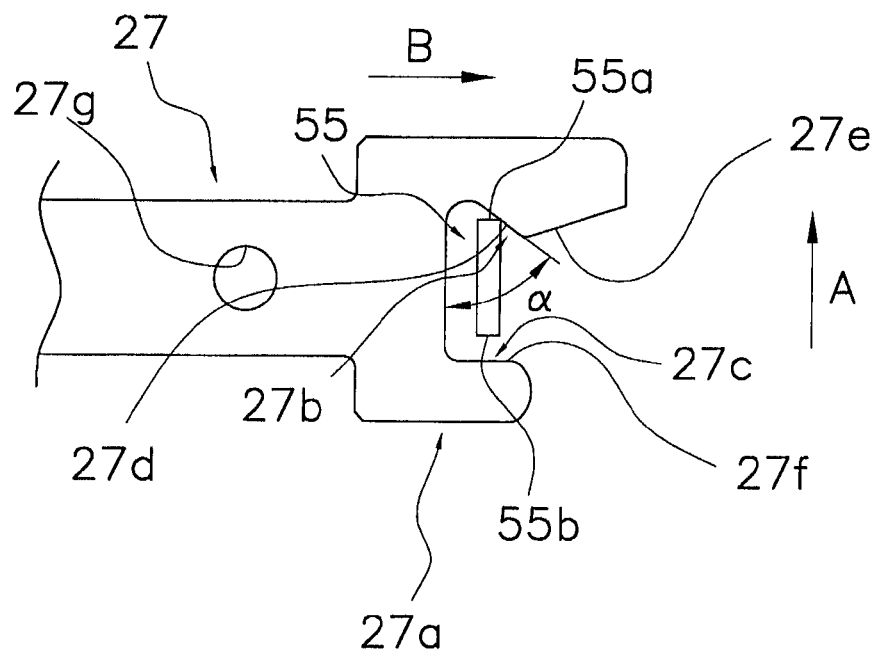
Figure 10:
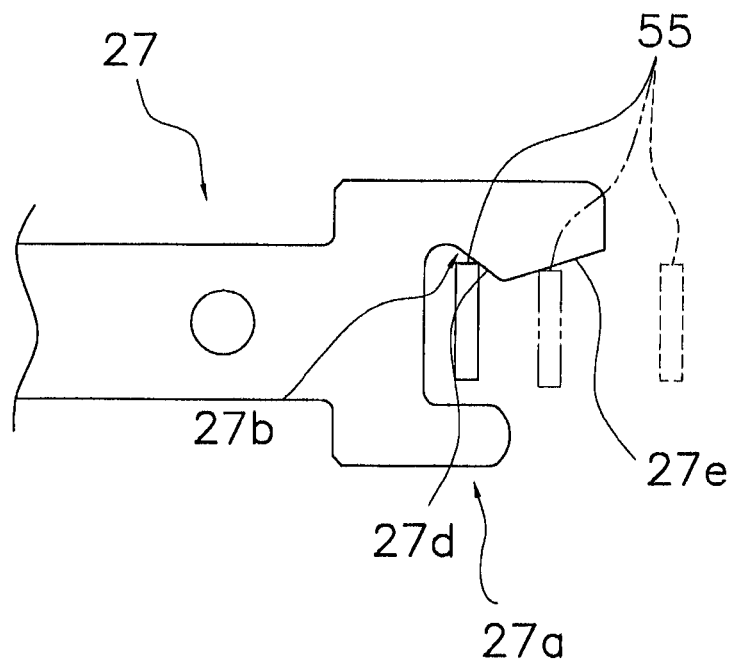
FIG. 10 is a schematic view showing the motion of the clutch plate when assembling the dual-bearing reel.

As shown in FIG. 9 and FIG. 10, the contact portion 27a is formed in a wider width than the other section. The contact portion 27a has a first contact portion 27b and a second contact portion 27c. The first contact portion 27b is urged to the handle attachment side (an example of one side) of the reel unit 1 by the clutch plate 55 when the first contact portion 27b is caused to move from the OFF position to the ON position by the clutch plate 55. The first contact portion 27b contacts a first end surface 55a of the clutch plate 55 on the upper side of FIG. 5. The first contact portion 27b has a first sloping portion 27d that slopes in such a way as to gradually become closer to the rod attachment portion 4 side heading toward the handle attachment side in the right-and-left direction of the reel R. The first sloping portion 27d acts when returning the clutch operation member 17 to the OFF position or the ON position. It is preferred that an angle of inclination a that the first sloping portion 27d forms with respect to the up-and-down direction be equal to or greater than 40° and equal to or less than 70°. In this embodiment, the angle of inclination a is 55°. When the angle of inclination a exceeds 70°, the urging force with which the clutch plate 55 urges the guide member 27 to the handle attachment side becomes small and it becomes difficult to draw the clutch operation member 17 to the handle attachment side. Further, when the angle of inclination a is less than 40°, the angle of the first sloping portion 27d becomes severe and the catching of the clutch plate 55 on the first contact portion 27d when removing the second side cover 7 becomes stronger. For this reason, there is the concern that this will bend the clutch plate 55 to the handle attachment side.

Further, the first contact portion 27b further has a second sloping portion 27e that gradually becomes farther away from the rod attachment portion 4 heading from the first sloping portion 27d toward the handle attachment side in the right-and-left direction of the reel R. The second sloping portion 27e acts when incorporating the clutch plate 55 into the first contact portion 27b. The second contact portion 27c is placed opposing the first contact portion 27b. The second contact portion 27c contacts a second end surface 55b of the clutch plate 55 when the clutch operation member 17 is operated from the OFF position to the ON position. The second end surface 55b is an end surface on the opposite side of the first end surface 55a. The second contact portion 27c has a flat portion 27f that is placed along the right-and-left direction. Because of this, in this embodiment, the clutch mechanism 21 can be operated from the OFF state to the ON state by the clutch operation member 17.

A through-hole 27g that the screw 28 penetrates is formed near the contact portion 27a of the guide member 27. In this way, the through-hole 27g fixed to the operation portion main body 26 by the screw 28 is placed near the contact portion 27a, so it becomes difficult for the plate-shaped guide member 27 to deform when the clutch operation member 17 is returned from the OFF position to the ON position by the clutch plate 55.

Configuration of Rotation Transmission Mechanism>

As shown in FIG. 2, the rotation transmission mechanism 19 has the drive shaft 30, a drive gear 31 that is attached, in such a way that it can freely rotate, to the drive shaft 30, and a tubular pinion gear 32 that meshes with the drive gear 31. The drive shaft 30 is attached, in such a way that it can freely rotate, via a bearing to the second side plate 9 and the second side cover 7, and the rotation (reverse rotation) of the drive shaft 30 in the fishing-line releasing direction is prohibited by the roller one-way clutch 86 and a pawl one-way clutch 87. The drive shaft 30 is supported, in such a way that it can freely rotate, in the mechanism attachment plate 13 and the third boss portion 7h of the second side cover 7. As described above, the rotation of the handle 2 is transmitted to the drive shaft 30 via the inner ring 86a of the roller one-way clutch 86 and the drag mechanism 23.

Figure 7:
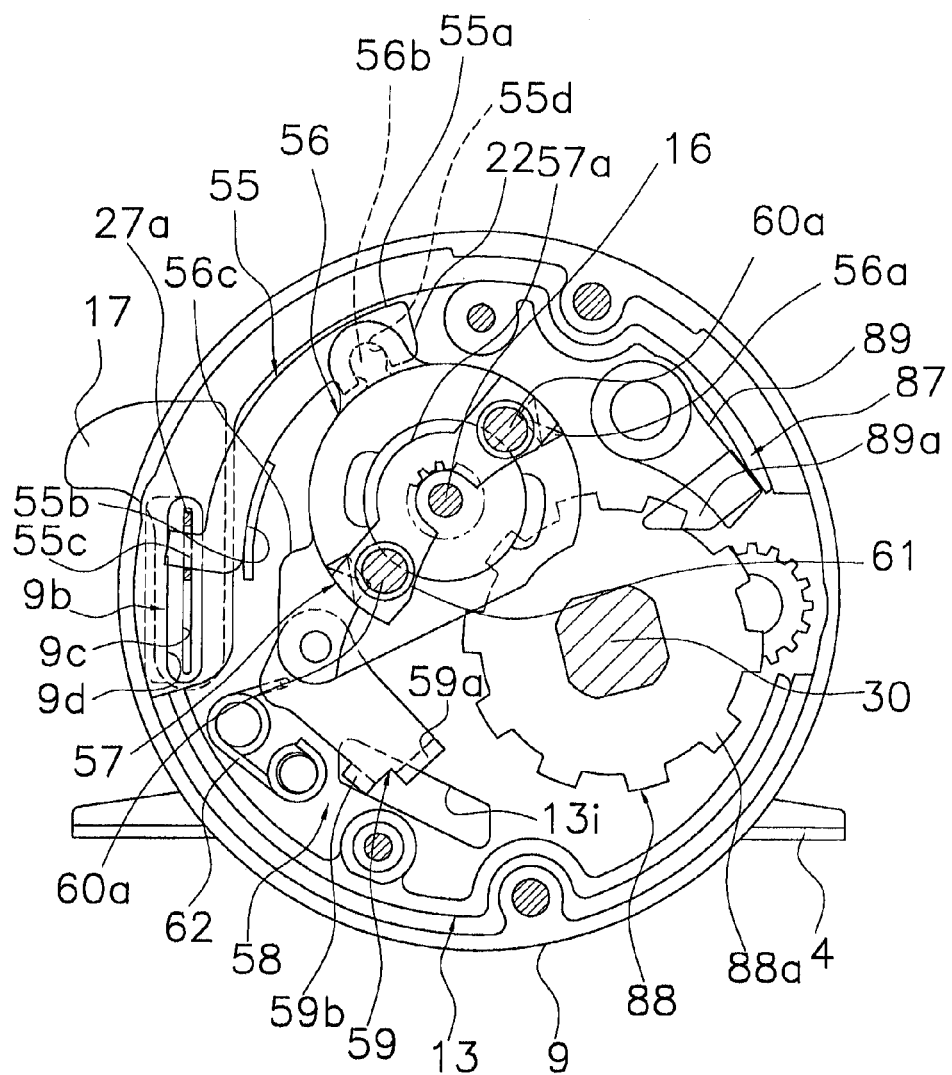
FIG. 7 is a side view of a state in which a side cover has been removed at a clutch ON state.

As shown in FIG. 7, the pawl one-way clutch 87 has a ratchet wheel 88 that is attached, in such a way as to be non-rotatable, to the drive shaft 30 and a ratchet pawl 89 that is attached, in such a way that it can freely swing, to the mechanism attachment plate 13. Ratchet teeth 88a that are formed projecting in substantially parallelogram shapes are placed apart from each other with an interval in the circumferential direction on the outer peripheral portion of the ratchet wheel 88, and the rotation of the drive shaft 30 in the fishing-line releasing direction is prohibited as a result of the ratchet pawl 89 meshing with the ratchet teeth 88a. The ratchet pawl 89 has, on its distal end portion, a control piece 89a that sandwiches the ratchet wheel 88 from both sides. The control piece 89a causes the ratchet pawl 89 to move away from the ratchet wheel 88 at the time of rotation in a fishing-line winding direction and to move toward the ratchet wheel 88 at the time of rotation in the fishing-line releasing direction.

As shown in FIG. 2, the drive gear 31 is attached, in such a way that it can freely rotate, to the drive shaft 30 and is coupled via the drag mechanism 23 to the drive shaft 30. The drag force of the drag mechanism 23 is adjusted by the star drag 3.

As shown in FIG. 2, the pinion gear 32 is a tubular member that extends inward from outside the second side plate 9 and whose center is penetrated by the spool shaft 16. One end side (the left side in FIG. 2) of the pinion gear 32 is supported, in such a way that it can freely rotate and in such a way that it can freely move in the axial direction, by a fourth bearing 33 in the form of a ball bearing in the fifth boss portion 13h having the fourth opening 13d in the mechanism attachment plate 13. The other end side (the right side in FIG. 2) of the pinion gear 32 is supported, in such a way that it can freely rotate and in such a way that it can freely move in the axial direction, by a fifth bearing 34 in the form of a ball bearing in the fourth boss portion 7i of the second side cover 7. Consequently, in this embodiment, the pinion gear 32 is not in contact with the spool shaft 16. Because of this, the rotational resistance of the spool 12 at the time of casting becomes smaller. A meshing groove 32a that meshes with the engagement pin 21a is formed in the left end portion of the pinion gear 32. Further, a narrow portion 32b is formed in the middle portion of the pinion gear 32, and a gear portion 32c that meshes with the drive gear 31 is formed on the right end portion of the pinion gear 32.

Configuration of Clutch Mechanism

The clutch mechanism 21 is placed between the handle 2 and the spool 12 and can take an ON state in which the clutch mechanism 21 links the handle 2 and the spool 12 and an OFF state in which the clutch mechanism 21 releases the linkage. The clutch mechanism 21 has the pinion gear 32, which has the meshing groove 32a, and the engagement pin 21a.

Configuration of Clutch Control Mechanism

The clutch control mechanism 22 is placed between the clutch operation member 17 and the clutch mechanism 21. The clutch control mechanism 22 transmits the switching operation of the clutch operation member 17 to the clutch mechanism 21, returns the clutch mechanism 21 to the ON state because of a return action of a later-described clutch return mechanism 58, and returns the clutch operation member 17 from the OFF position to the ON position. As shown in FIG. 7, the clutch control mechanism 22 has the clutch plate 55 that contacts the contact portion 27a, a clutch cam 56 that engages with the clutch plate 55 and rotates about the spool shaft 16, and a clutch yoke 57 that moves along the direction of the spool shaft 16 because of the clutch cam 56.

The clutch plate 55 moves in conjunction with the movement of the clutch operation member 17 from the ON position to the OFF position and causes the clutch operation member 17 to move from the OFF position to the ON position in conjunction with the return action of the later-described clutch return mechanism 58. The clutch plate 55 is a plate-shaped member made of metal that is formed in the shape of a fan. The clutch plate 55 has the first end surface 55a on its outer peripheral side and the second end surface 55b on its inner peripheral side. The clutch plate 55 is guided in the rotational direction by a guide portion (not shown in the drawings) formed on the mechanism attachment plate 13. A first catch portion 55c is formed on one end of the clutch plate 55. The first catch portion 55c extends in such a way as to be placed between the first contact portion 27b and the second contact portion 27c of the contact portion 27a.

A second catch portion 55d is formed on the other end of the clutch plate 55. The second catch portion 55d is formed in the shape of a "U" in such a way as to be caught on the clutch cam 56. The clutch plate 55 rotates about the spool shaft 16 in conjunction with the clutch cam 56, rotates to the OFF state side in conjunction with the operation of the clutch operation member 17 downward from the ON position to the OFF position, and rotates to the ON state side in conjunction with the operation of the clutch operation member 17 from the OFF position to the ON position.

The clutch cam 56 is a substantially ring-shaped member made of synthetic resin such as polyacetal resin, for example. The clutch cam 56 is attached, in such a way that it can freely rotate about the spool shaft 16, to the outer peripheral surface of the fifth boss portion 13h formed on the mechanism attachment plate 13. The clutch cam 56 is retained by a retaining plate 60 (see FIG. 2) that is screwed to the distal end of the fifth boss portion 13h. A pair of guide shafts 60a that guide the clutch yoke 57 in the spool 12 axial direction are disposed upright on the retaining plate 60.

A pair of inclined cams 56a are formed in positions on the outside surface of the clutch cam 56 that oppose each other across the spool shaft 16. An engagement pin 56b that engages with the second catch portion 55d of the clutch plate 55 is formed on the outer peripheral portion of the clutch cam 56. Moreover, a projecting portion 56c is formed on the outer peripheral portion of the clutch cam 56, and a return member 59 that configures the clutch return mechanism 58 is attached, in such a way that it can freely swing, to the mechanism attachment plate 13 side of this projecting portion 56c.

The clutch yoke 57 is placed opposing the axial direction outside of the clutch cam 56. The clutch yoke 57 is guided by the pair of guide shafts 60a disposed upright across the spool shaft 16 between the mechanism attachment plate 13 and the second side cover 7 and can freely move in the spool shaft 16 direction. Further, the clutch yoke 57 is urged inward in the axial direction (leftward in FIG. 2) by coil springs 61 (see FIG. 2) that are placed in a compressed state on the outer peripheral sides of the guide shafts 60a between the second side cover 7 and the clutch yoke 57.

A semicircular arc-shaped engagement portion 57a that engages with the narrow portion 32b of the pinion gear 32 is formed on the clutch yoke 57. Unillustrated inclined cams that ride up on the inclined cams 56a are formed on the side surfaces of the clutch yoke 57 that oppose the clutch cam 56, and when the clutch cam 56 rotates counter-clockwise in FIG. 7 and the inclined cams of the clutch yoke 57 ride up on inclined cams 56a, the clutch yoke 57 moves to the clutch OFF position to the right in FIG. 2. Further, when the inclined cams of the clutch yoke 57 come down from the inclined cams 56a, the clutch yoke 57 is urged by the coil springs 61 and returns to the clutch ON position. The pinion gear 32 moves in the spool 12 axial direction in conjunction with the movement of the clutch yoke 57, and the clutch mechanism 21 switches between the OFF state and the ON state.

Configuration of Clutch Return Mechanism

When the clutch mechanism 21 is in the OFF state, the clutch return mechanism 58 returns the clutch mechanism 21 in the OFF state to the ON state in conjunction with the rotation of the handle 2 in the fishing-line winding direction. The clutch return mechanism 58 has the ratchet wheel 88 that rotates in conjunction with the handle 2, the clutch cam 56 that rotates in conjunction with the clutch operation member 17, the return member 59 that is coupled to the clutch cam 56 in such a way that the return member 59 can freely swing, and a toggle spring 62 that urges the return member 59.

The return member 59 is a plate-shaped member made of metal such as a stainless alloy and is coupled, in such a way that it can freely swing, to the clutch cam 56. The return member 59 moves, because of the rotation of the clutch cam 56, between an engagement position (FIG. 8) in which the return member 59 contacts the ratchet teeth 88a of the ratchet wheel 88 and an away position (FIG. 7) in which the return member 59 is away from the ratchet teeth 88a of the ratchet wheel 88. An engagement pawl 59a, which contacts the ratchet teeth 88a, and a guide pawl 59b, which is guided in a long and narrow guide groove 13i formed in the mechanism attachment plate 13, are formed on, by bending, the distal end of the return member 59. The proximal end of the return member 59 is coupled, in such a way that it can freely swing, to the distal end of the projecting portion 56c, and the toggle spring 62 is coupled to the proximal end of the return member 59.

The toggle spring 62 includes a torsion coil spring having one end that is caught on the return member 59 and another end that is caught on the mechanism attachment plate 13 in such a way that the other end can freely rotate. The toggle spring 62 urges the return member 59 between two positions—the engaged position and the disengaged position—and holds the return member 59 in both positions. Further, the toggle spring 62 holds in the clutch ON position and the clutch OFF position the clutch cam 56 via the return member 59.

Figure 8:
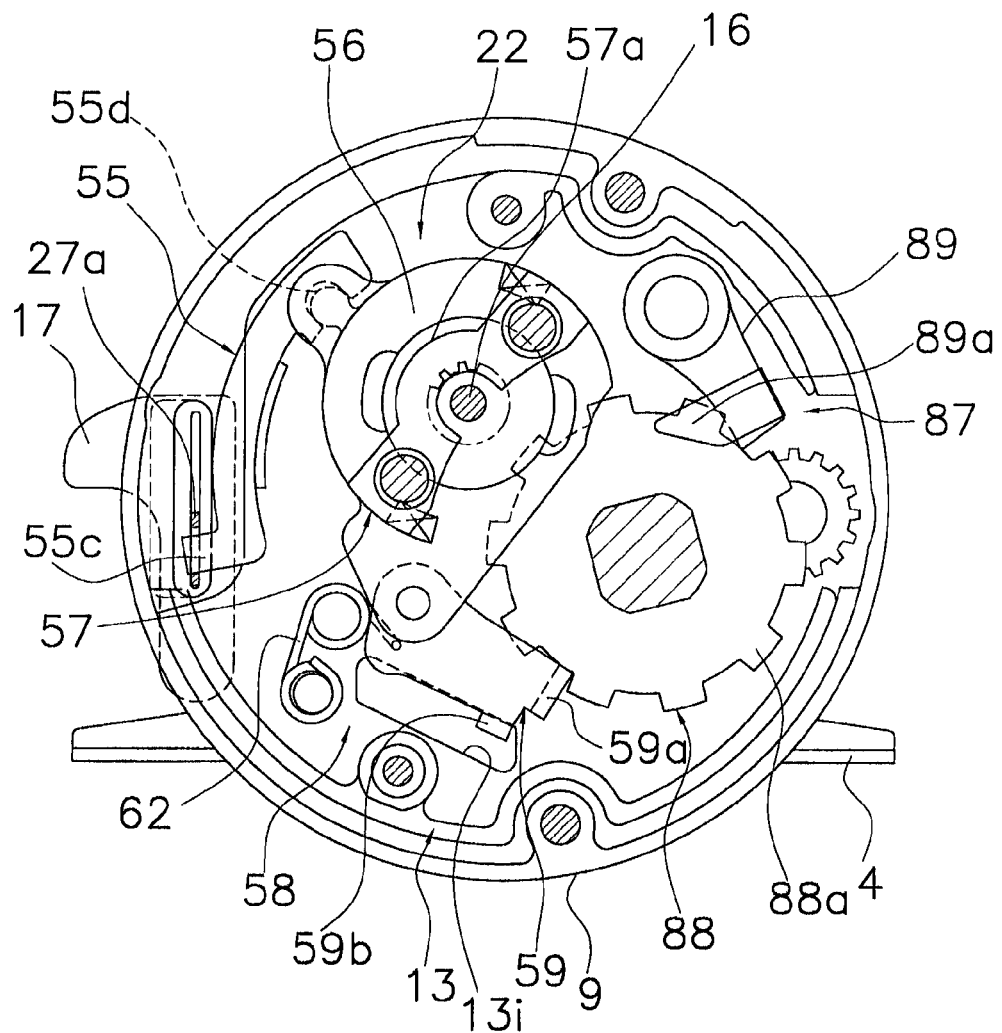
FIG. 8 is side view of a state in which the side cover has been removed at a clutch OFF state.

In this clutch return mechanism 58, when the clutch operation member 17 is operated by being pressed down from the ON position to the OFF position, the clutch cam 56 rotates counter-clockwise and the return member 59 moves forward from the disengaged position shown in FIG. 7 to the engaged position shown in FIG. 8 in which the return member 59 contacts the ratchet teeth 88a. At this time, until the toggle spring 62 exceeds the dead center, the guide pawl 59b of the return member 59 is guided on the outside edge of the guide groove 13i counter to the urging force of the toggle spring 62 and the return member 59 moves forward toward the ratchet wheel 88. When the toggle spring 62 exceeds the dead center, the return member 59 rotates counter-clockwise, the guide pawl 59b of the return member 59 is guided on the inside edge of the guide groove 13i, and the return member 59 moves to the engaged position.

In this state in which the return member 59 is in the engaged position, when the drive shaft 30 rotates in the fishing-line winding direction because of the operation of the handle 2, the engagement pawl 59a of the return member 59 is pressed by the ratchet teeth 88a and the return member 59 returns to the disengaged position. At the same time as this, the clutch cam 56 rotates clockwise in FIG. 8 and returns the clutch mechanism 21 to the ON state. The clutch operation member 17 returns from the OFF position to the ON position because of the rotation of the clutch cam 56.

Actions of Dual-Bearing Reel

When casting is performed, the clutch operation member 17 is pressed downward. Then, the first contact portion 27b of the guide member 27 presses the first catch portion 55c and the clutch plate 55 rotates counter-clockwise in FIG. 7. When the clutch plate 55 rotates, the clutch cam 56 rotates counter-clockwise in conjunction therewith and is placed in the clutch OFF position shown in FIG. 8. Further, the clutch yoke 57 moves to the clutch OFF position to the right in FIG. 2. As a result of this, the pinion gear 32 that configures the clutch mechanism 21 moves outward in the axial direction and switches to the OFF state. In this OFF state the spool 12 switches to a state of free rotation, and when casting is performed, the fishing line is paid out with force from the spool 12 because of the weight of the terminal tackle.

When the terminal tackle lands on the water, the clutch operation member 17 switches to the ON state when the handle 2 is rotated in the fishing-line winding direction. Further, even if the clutch operation member 17 is operated by being pressed up from the OFF position to the ON position, the clutch operation member 17 switches to the ON state. When the handle 2 is rotated in the fishing-line winding direction, the ratchet wheel 88 rotates in the fishing-line winding direction (clockwise in FIG. 8), and the ratchet pawl 89 swings to the outside of the ratchet wheel 88 because of the action of the control piece 89a. As a result of this, the ratchet pawl 89 no longer contacts the ratchet wheel 88 at the time of line retraction, and it becomes difficult for a clicking sound resulting from contact between both to arise at the time of line retraction. Further, when the ratchet wheel 88 rotates in the fishing-line winding direction, the ratchet teeth 88a come into contact with the engagement pawl 59a on the distal end of the return member 59 and press the return member 59 rearward. Then, the return member 59 exceeds the dead center of the toggle spring 62, moves backward, and is urged to the disengaged position by the toggle spring 62. In conjunction with this movement, the clutch cam 56 rotates clockwise in FIG. 8, the clutch yoke 57 moves to the clutch ON position because of the urging force of the coil springs 61, and the clutch mechanism 21 switches to the ON state. For this reason, the rotation of the handle 2 is transmitted to the spool 12, and the spool 12 becomes rotatable in the fishing-line winding direction. When the drive shaft 30 rotates in the fishing-line winding direction, the rotation thereof is transmitted to the level-wind mechanism 18 and the fishing line is retracted uniformly onto the spool 12.

When the clutch mechanism 21 returns from the OFF state to the ON state because of this clutch return mechanism 58, as shown in FIG. 9, the first catch portion 55c of the clutch plate 55 contacts and presses the guide member 27 of the clutch operation member 17. Specifically, the first end surface 55a of the first catch portion 55c contacts the first sloping portion 27d of the first contact portion 27b and presses the guide member 27 up indicated by arrow A. The first sloping portion 27d is a sloping portion that slopes downward to the right and becomes closer to the rod attachment portion 4 heading toward the handle attachment side, so when the first end surface 55a of the first catch portion 55c presses the first sloping portion 27d, the first end surface 55a urges the guide member 27 to the handle attachment side indicated by arrow B. As a result of this, the operation portion main body 26 of the clutch operation member 17 is urged to the second insert member 9b side of the handle attachment side. Because of this, the clutch operation member 17 supported at both ends in the reel unit 1 stably and strongly contacts the reel unit 1 on the handle attachment side, so it becomes difficult for the clutch operation member 17 to lean. For this reason, even when the clutch operation member 17 is supported at both ends, it becomes easier for the clutch operation member 17 to return to the ON position.

On the other hand, even when the clutch operation member 17 is operated by being pressed up from the OFF position to the ON position, the clutch mechanism 21 can be returned from the OFF state to the ON state. In this case, the second contact portion 27c of the contact portion 27a presses the second end surface 55b of the first catch portion 55c, the clutch plate 55 rotates clockwise in FIG. 8, and the clutch cam 56 rotates in the same direction. Because of this, the clutch mechanism 21 returns to the ON state and the clutch return mechanism 58 also returns to the disengaged position. At this time, the second contact portion 27c that contacts the first catch portion 55c is the flat portion 27f, so the second contact portion 27c does not urges the guide member 27 in the axial direction.

Further, after the spool 12 has been removed from the second side cover 7 side or at the time of reel assembly, when the second side cover 7 in which the various mechanisms including the clutch plate 55 are attached between the second side cover 7 and the mechanism attachment plate 13 is to be attached to the frame 5, as shown in FIG. 10, the first catch portion 55c of the clutch plate 55 indicated by the dashed line contacts the second sloping portion 27e of the first contact portion 27b as indicated by the long dashed double-short dashed line. The second sloping surface 27e is a sloping surface that gradually becomes farther away from the rod attachment portion 4 heading from the first sloping portion 27d toward the handle attachment side. For this reason, the first catch portion 55c of the clutch plate 55 incorporated from the handle attachment side is guided to the first sloping portion 27d while contacting the second sloping portion 27e. For this reason, it becomes difficult for the clutch plate 55 to collide with the contact portion 27a, the incorporation of the clutch plate 55 becomes easy, and the incorporation of the second side cover 7 becomes easy.

Other Embodiments

An embodiment of the present invention has been described above, but the present invention is not limited to the embodiment and is capable of a variety of changes without departing from the gist of the invention. In particular, the plural embodiments and modifications written in the present specification can be arbitrarily combined as needed.

(a) In the embodiment, the second contact portion 27c is disposed in such a way that it can be switchingly operated from the OFF state to the ON state by the clutch operation member 17, but it is also alright if the second contact portion is not disposed.

(b) In the embodiment, the guide member is made of metal plate material, but the present invention is not limited to this. For example, a shaft member can also be used as the guide member. In this case, the contact portion on the distal end of the guide member can be bent in such a way that the angle of inclination a the contact portion forms with the up-and-down direction becomes the aforementioned angular range (e.g., equal to or greater than 40° and equal to or less than 70°). In this case, the second contact portion can be formed by further bending.

(c) In the embodiment, the clutch operation member 17 is configured in such a way as to be urged to the handle attachment side by the clutch plate 55 by disposing the first sloping portion 27d on the first contact portion 27b, but the present invention is not limited to this. For example, a sloping portion that slopes in the same way as the first sloping portion can also be disposed on the clutch plate, and a contact portion that can contact the sloping portion can also be disposed on the clutch operation member. Further, a cam mechanism can also be disposed in the reel unit so that as the clutch plate moves in the clutch ON direction it moves to the handle attachment side.

(d) In the embodiment, the clutch operation member 17 is moved in the up-and-down direction, but the clutch operation member 17 can also be moved in a front-and-rear direction.

Characteristics

The embodiment can be realized as described below.

(A) The dual-bearing reel R is a reel that forwardly r out a fishing line. The dual-bearing reel is equipped with the reel unit 1, the spool 12, the handle 2, the clutch mechanism 21, the clutch operation member 17, the clutch return mechanism 58, and the clutch control mechanism 22. The reel unit 1 has the rod attachment portion 4 that can be attached to a fishing rod. The spool 12 is supported, in such a way that it can freely rotate, in the reel unit 1. The handle 2 is placed on one side of the reel unit 1 in a right-and-left direction and is for rotationally operating the spool 12. The clutch mechanism 21 is placed between the handle 2 and the spool 12 and can take an ON state in which the clutch mechanism 21 links the spool 12 and the handle 2 and an OFF state in which the clutch mechanism 21 releases the linkage. The clutch operation member 17 is a member for switchingly operating the clutch mechanism 21 at least from the ON state to the OFF state. Both ends of the clutch operation member 17 in the right-and-left direction are supported in the reel unit 1 in such a way that the clutch operation member 17 can move between an OFF position in which the clutch mechanism 21 switches to the OFF state and an ON position in which the clutch mechanism 21 switches to the ON state. The clutch return mechanism 58 returns the clutch mechanism 21 in the OFF state to the ON state in response to the rotation of the handle 2 in a fishing-line winding direction. The clutch control mechanism 22 is placed between the clutch operation member 17 and the clutch mechanism 21. The clutch control mechanism 22 transmits the switching operation of the clutch operation member 17 to the clutch mechanism 21 and returns the clutch mechanism 21 to the ON state because of the return action of the clutch return mechanism 58. Further, the clutch return mechanism 58 returns the clutch operation member 17 from the OFF position to the ON position. The clutch control mechanism 22 has the clutch plate 55 that moves in conjunction with the movement of the clutch operation member 17 from the ON position to the OFF position and causes the clutch operation member 17 to move from the OFF position to the ON position in conjunction with the return action of the clutch return mechanism 58. The clutch plate 55 has the first end surface 55a on the ON position side and the second end surface 55b on the OFF position side. The clutch operation member 17 has the contact portion 27a that contacts at least the first end surface 55a of the clutch plate 55. The contact portion 27a has the first contact portion 27b that is urged to the handle attachment side of the reel unit 1 by the clutch plate 55 when the clutch operation member 17 is caused to move from the OFF position to the ON position by the clutch plate 55.

In this dual-bearing reel R, when the clutch operation member 17 is operated from the ON position to the OFF position, the clutch control mechanism 22 acts in conjunction therewith and the clutch mechanism 21 switches from the ON state to the OFF state. In this OFF state, the spool 12 switches to a state of free rotation and the fishing line becomes capable of being paid out by casting or the like. When the handle 2 is rotated in the fishing-line winding direction after the fishing line has been paid out, the clutch mechanism 21 switches to the ON state because of the clutch return mechanism 58, and the clutch plate 55 of the clutch control mechanism 22 causes the clutch operation member 17 to move from the OFF position to the ON position. At this time, the first contact portion 27b of the contact portion 27a is urged to the one side (handle attachment side) of the reel unit 1 by the clutch plate 55. Because of this, the clutch operation member 17 supported at both ends in the reel unit 1 stably and strongly contacts the second insert member 9b of the reel unit 1 on the handle attachment side, so it becomes difficult for the clutch operation member 17 to lean. For this reason, it becomes easier for the clutch operation member 17 to return to the ON position even when the clutch operation member 17 is supported at both ends.

(B) In the dual-bearing reel R, the reel unit 1 has the frame 5 that has, on the handle attachment side, an opening 11c through which the spool 12 can pass and the second side cover 7 that covers the handle attachment side of the frame 5 and is detachably attached to the frame 5. In this case, the dual-bearing reel R in which the spool 12 can be attached and detached from the handle attachment side can be configured.

(C) In the dual-bearing reel R, the first contact portion 27b has the first sloping portion 27d that gradually becomes closer to the first end surface 55a heading toward the handle attachment side in the right-and-left direction. In this case, when the clutch plate 55 moves in the direction of the ON position as a result of the first end surface 55a of the clutch plate 55 contacting the first sloping portion 27d, the first contact portion 27b is drawn to the one side—that is, the handle attachment side—of the reel unit 1 by the sloping surface of the first sloping portion 27d. For this reason, the clutch operation member 17 can be urged with a simple configuration utilizing the movement of the clutch plate 55 to the ON position side.

(D) In the dual-bearing reel R, the first contact portion 27b further has the second sloping portion 27e that gradually becomes farther away from the first end surface 55a heading from the first sloping portion 27d toward the handle attachment side in the right-and-left direction. Here, in the case of assembling the dual-bearing reel R or in the case of replacing the spool 12 and attaching the second side cover 7 to the frame 5, the clutch plate 55 is guided to the first sloping portion 27d by the second sloping portion 27e when incorporating the clutch plate 55 into the clutch operation member 17 in which the first sloping portion 27d is disposed on the first contact portion 27b. Because of this, it becomes difficult for the clutch plate 55 to collide with the first contact portion 27b, and the incorporation of the clutch plate 55 becomes easy.

(E) In the dual-bearing reel R, the contact portion 27a further has the second contact portion 27c that contacts the second end surface 55b of the clutch plate 55 when the clutch operation member 17 is operated from the OFF position to the ON position.

In this case, when the clutch operation member 17 is operated from the OFF position to the ON position, the second contact portion 27c contacts the second end surface 55b of the clutch plate 55, so the clutch mechanism 21 can be returned from the OFF state to the ON state not only by the clutch return mechanism 58 but also by the clutch operation member 17.

(F) In the dual-bearing reel R, the frame 5 has the first side plate 8 that is placed on the opposite side of the handle attachment side and the second side plate 9 that is placed apart from the first side plate 8 an interval in the right-and-left direction. The first side plate 8 and the second side plate 9 have, respectively, the first slit 8c and the second slit 9c that support the clutch operation member 17 in such a way that the clutch operation member 17 can freely move in the up-and-down direction toward and away from the rod attachment portion 4.

(G) In the dual-bearing reel R, the clutch operation member 17 has the operation portion main body 26 and the guide member 27. The operation portion main body 26 is a main body made of synthetic resin that is placed between the first side plate 8 and the second side plate 9. The guide member 27 is a member made of metal plate material that is fixed to the operation portion main body 26, and whose both ends in the right-and-left direction are guided in the first slit 8c and the second slit 9c, and whose end portion on the handle attachment side extends beyond the second slit 9c, and in which the contact portion 27a is placed on the end portion on the handle attachment side.

(H) In the dual-bearing reel R, the first side plate 8 has the first insert member 8b made of synthetic resin in which the first slit 8c is formed. The second side plate 9 has the second insert member 9b made of synthetic resin in which the second slit 9c is formed.

In this case, the guide member 27 made of metal plate material is smoothly guided in the first slit 8c and the second slit 9c formed, respectively, in the first insert member 8b and the second insert member 9b made of synthetic resin.

(I) In the dual-bearing reel R, the clutch operation member 17 is supported, behind the spool 12, in the reel unit 1 in such a way that the clutch operation member 17 can move between the OFF position near the rod attachment portion 4 and the ON position farther away from the rod attachment portion 4 than the OFF position.

In this case, the clutch operation member 17 is operated behind the spool 12, so it is easy to operate the clutch operation member 17 from the ON position to the OFF position with a thumbing hand.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A dual-bearing reel that forwardly reels out a fishing line, the dual-bearing reel comprising:
   a reel unit including a rod attachment portion that is attachable to a fishing rod;
   a spool being supported by the reel unit to be rotated;

a handle being configured on a side of the reel unit to operate rotationally the spool;

a clutch mechanism being configured between the handle and the spool;

a clutch operation member including two ends being supported by the reel unit, the clutch operation member being arranged to be operated in order to make the clutch mechanism at least turning off in linking the handle and the spool;

a clutch return mechanism being configured to turn the clutch mechanism on in response to rotation of the handle in a fishing-line winding direction; and a clutch control mechanism being configured between the clutch operation member and the clutch mechanism to transmit an operation of the clutch operation member to the clutch mechanism, turn the clutch mechanism to on in response to an operation of the clutch return mechanism, and return the clutch operation member from an off position to an on position, the clutch control mechanism including a clutch plate that moves in conjunction with movement of the clutch operation member from the on position to the off position and causes the clutch operation member to move from the off position to the on position in conjunction with the operation of the clutch return mechanism, the clutch plate including a first end surface closer to the on position than to the off position of the clutch operation member and a second end surface opposite to the first end surface, the clutch operation member including a contact portion at which the clutch operation member contacts at least the first end surface of the clutch plate, the contact portion including a first contact portion that is urged to the side of the reel unit by the clutch plate when the clutch operation member is moved from the off position to the on position by the clutch plate.

2. The dual-bearing reel according to claim 1, wherein the reel unit includes
   a frame that has, on the handle attachment side, an opening through which the spool passes and
   a cover member that covers the handle attachment side of the frame and is detachably attached to the frame.

3. The dual-bearing reel according to claim 2, wherein the first contact portion has a first sloping portion that gradually becomes closer to the first end surface heading toward the side.

4. The dual-bearing reel according to claim 3, wherein the first contact portion includes a second sloping portion that gradually becomes farther away from the first end surface from the first sloping portion toward the side.

5. The dual-bearing reel according to claim 2, wherein the frame includes a first side plate that is configured on an opposite side of the handle attachment side and a second side plate that is configured apart from the first side plate with an interval, and
the first side plate and the second side plate have respectively a first slit and a second slit that freely guide the clutch operation member in a moving direction.

6. The dual-bearing reel according to claim 5, wherein the clutch operation member includes
   an operation portion main body made of synthetic resin, where the operation portion main body is configured between the first side plate and the second side plate, and
   a guide member made of metal plate material, where the guide member is fixed to the operation portion main body,
both ends of the guide member are guided in the first slit and the second slit,
an end portion of one of the ends of the guide member on the side extends beyond the second slit, and
the contact portion is configured on the end portion on the side.

7. The dual-bearing reel according to claim 6, wherein the first side plate includes a first insert member made of synthetic resin in which the first slit is formed, and
the second side plate has a second insert member made of synthetic resin in which the second slit is formed.

8. The dual-bearing reel according to claim 1, wherein the contact portion further has a second contact portion that contacts the second end surface of the clutch plate when the clutch operation member is operated from the OFF position to the ON position.

9. The dual-bearing reel according to claim 1, wherein the clutch operation member is supported, behind the spool, by the reel unit such that the clutch operation member is arranged to move between the off position near the rod attachment portion and the on position farther away from the rod attachment portion than the off position.

* * * * *